Dec. 29, 1970　　　E. L. BISHOP ETAL　　　3,551,252
MULTIPLE PLY STOCK SERVICER
Filed Jan. 15, 1968　　　　　　　　　　　　4 Sheets-Sheet 1

INVENTORS
EARL L. BISHOP
LESTER T. SHARP
BY
*Teare, Teare & Sammon*
ATTORNEYS

Dec. 29, 1970  E. L. BISHOP ETAL  3,551,252

MULTIPLE PLY STOCK SERVICER

Filed Jan. 15, 1968  4 Sheets-Sheet 2

INVENTORS
EARL L. BISHOP
LESTER T. SHARP
BY
*Teare, Teare & Sammon*
ATTORNEYS

INVENTORS
EARL L. BISHOP
LESTER T. SHARP
BY
Teare, Teare & Sammon
ATTORNEYS

Dec. 29, 1970   E. L. BISHOP ETAL   3,551,252
MULTIPLE PLY STOCK SERVICER
Filed Jan. 15, 1968   4 Sheets-Sheet 4

INVENTORS
EARL L. BISHOP
LESTER T. SHARP
BY
*Teare, Teare & Sammon*
ATTORNEYS

United States Patent Office 3,551,252
Patented Dec. 29, 1970

3,551,252
MULTIPLE PLY STOCK SERVICER
Earl L. Bishop and Lester T. Sharp, Cuyahoga Falls, Ohio, assignors, by mesne assignments, to Eagle-Picher Industries, Inc., Cincinnati, Ohio, a corporation of Ohio
Filed Jan. 15, 1968, Ser. No. 697,671
Int. Cl. B29h 17/20
U.S. Cl. 156—406     16 Claims

ABSTRACT OF THE DISCLOSURE

Apparatus for supplying plies of tire building stock to a tire building drum wherein two trackways are disposed behind the drum, one extending in a direction axially of the drum and the other extending in a direction normal to the axis of the drum. Carriages are mounted for movement along the respective trackways from a storage position remote from the drum to a stock applying position adjacent the drum. Each carriage has provision for storing one or more rolls of tire applying stock and one of the carriages has a pan for supporting a layer of tread stock and is adapted to be moved from a storage position remote from the drum to a tread applying position adjacent the drum.

BACKGROUND OF THE INVENTION

Field of the invention

The invention relates to tire building apparatus and particularly to apparatus for storing and presenting tire building stock from a storage position remote from the drum to a stock applying position adjacent the drum.

Description of the prior art

Heretofore previous stock servicers embodying more than 4-ply applications required the stock to travel at considerable distances and through intricate paths to reach the drum. This produced a variable tension on the stock with resulting uneven quality of components within the finished tire, and also created problems in the mounting of the stock rolls and in threading the stock through the servicer.

SUMMARY OF THE INVENTION

The apparatus of the present invention utilizes a trackway which extends substantially parallel to the axis of the drum, but is located behind the drum, and another trackway which extends in a direction normal to the axis of the drum is also disposed behind the drum. The center line of the last named trackway is substantially in a vertical plane which passes radially through the drum at the mid-portion thereof. The trackway which extends axially of the drum has one or more carriages thereon, whereas the trackway which extends normal to the drum has a single carriage thereon. Each carriage is movable along its trackway and carries one or more rolls of stock, while one of the carriages has a tread pan mounted thereon for movement from a storage position which is remote from the drum to a tread applying position adjacent the drum. Such arrangement minimizes the distance which the stock must be moved from storage to operative position. Additionally, each roll of stock may be readily accessible for replenishing and each roll when in operative position has a relatively short distance between the take-off point and the point of contact with the drum. Thus there is no problem in threading the stock through the servicer and each ply is readily accessible to an operator for application to the drum. Additionally, the tension of the stock as it is applied to the drum is uniform for all plies, whereby a tire which is made from the band will possess improved quality.

An object of the invention is to minimize the distances through which various plies of stock must be moved before reaching the drum and to facilitate the threading of the stock through a servicer.

An additional object is to reduce the time for changing the stock rolls and to make them readily accessible for replenishment.

A further object is to provide an apparatus by means of which the tension of the various stock plies may be maintained uniform as the material is being transferred from its supply roll to the drum.

DESCRIPTION OF THE PREFERRED EMBODIMENTS

Figure 1:
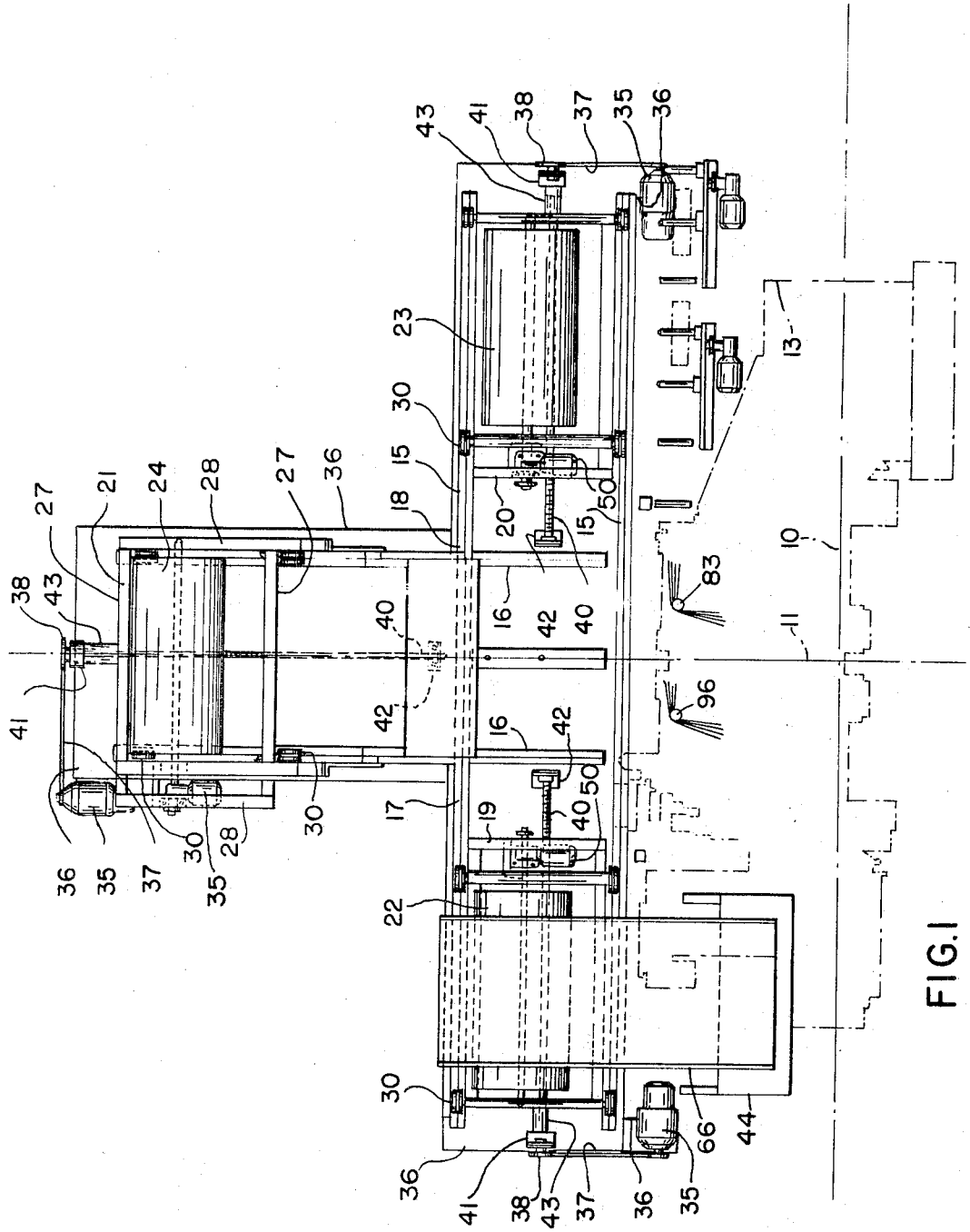
FIG. 1 is a top plan view of a tire ply servicing apparatus embodying the present invention.

In FIG. 1, the axial center line of the tire building drum is indicated at 10 while the median radially extending center line of the drum is indicated at 11. The drum itself is indicated by the broken lines 12 in FIG. 3. The mounting for the drum and the driving equipment for it are indicated in outline form by the broken lines 13 in FIGS. 1 and 3.

The servicing apparatus which forms the basis for the present invention includes two trackways which are mounted on the floor behind the drum, one of which extends in a direction axially of the drum and the other of which extends in a direction normal to the axis of the drum. The axially extending trackway comprises a pair of rails indicated at 15 while the other trackway is indicated by a pair of rails indicated at 16. The rails are in the same plane and have a cross-over arrangement at the points of intersection 17 and 18 (FIG. 1) for enabling the wheels of carriages on the respective trackways to travel the length of the trackway during use. The axially extending trackway preferably extends on opposite sides of the center line 11 a distance sufficient to enable the carriages 19 and 20 thereon to be moved from a storage to a drum supplying position. The other trackway has a length sufficient to accommodate the movement of a carriage 21 from a storage position rearwardly of the drum to a position adjacent the drum.

In the preferred arrangement, each carriage comprises a unit which is adapted to be moved along its trackway independently of the other carriages and each is adapted to support one or more rolls of ply stock, as desired. Such supply rolls are indicated at 22, 23 and 24 on the carriages 19, 20 and 21, respectively.

Figure 2:
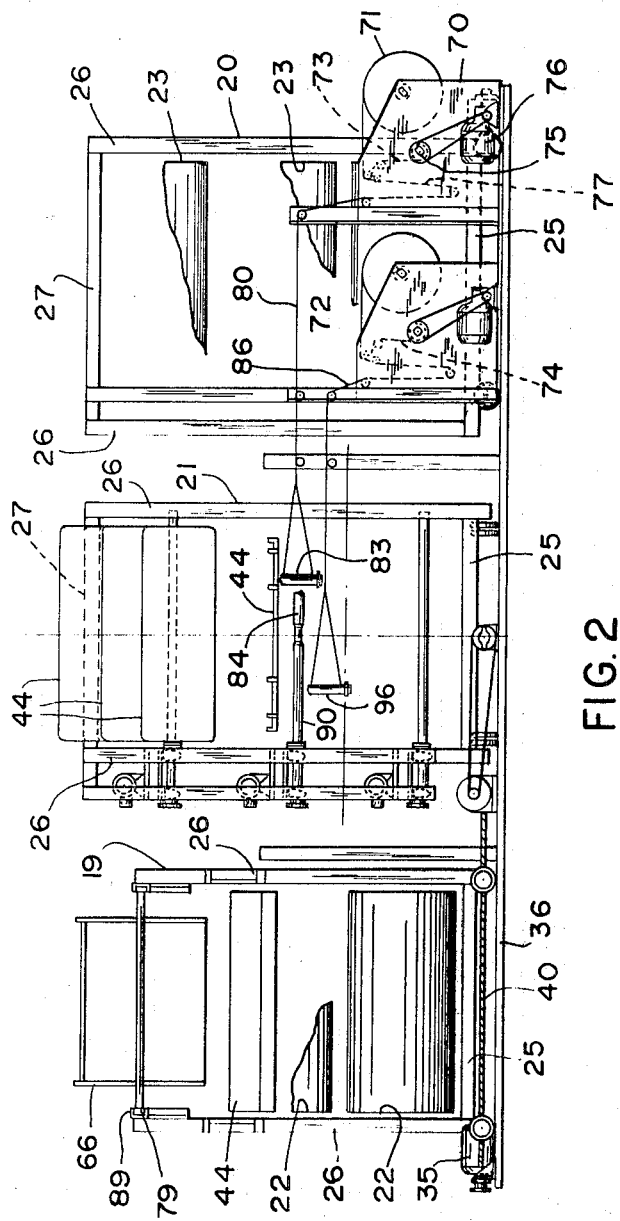
FIG. 2 is a front elevation of the apparatus shown in FIG. 1.
Figure 3:
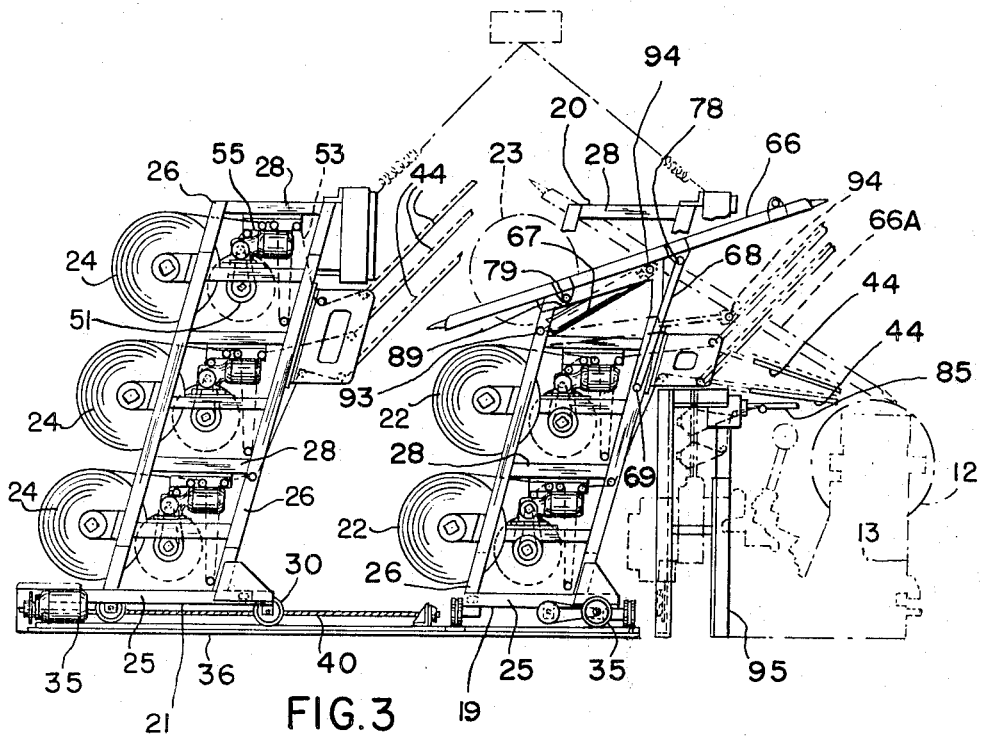
FIG. 3 is a side view of the apparatus as viewed from the left-hand side of FIG. 1.

Each carriage may comprise an open frame having a base 25 (FIG. 3) and corner uprights 26 which are connected by cross beams 27 (FIGS. 1 and 2) and end beams 28 (FIG. 3). The uprights 26 are shown as being inclined toward the drum so as to enable the supply rolls to be offset vertically, thereby facilitating replenishment of the rolls whenever necessary. Each carriage is mounted on rollers 30 which travel along its associated trackway.

Each carriage may be propelled along its trackway by suitable power driven apparatus from a storage position, as shown in FIG. 1, to a position directly behind the drum, where the stock can be removed by the operator and applied to the drum. The mechanism for propelling the carriages is preferably identical for the respective units, hence the apparatus for propelling the carriage 19 will be described. Counterpart elements for carriages 20 and 21 will be indicated by the same reference characters used in connection with the description for the carriage 19.

The preferred form of the propulsion apparatus includes an electric motor 35 which may be mounted upon a floor plate 36. The motor may be connected, as by a chain drive 37, to a sprocket wheel 38 which is fixedly connected to one end of a screw shaft 40. The shaft 40 may be journaled in bearings 41 and 42, respectively, which are fixed to the base 36. The screw shaft is in threaded engagement with a nut 43 which is attached to the base of the carriage frame. Thus, as the screw shaft 40 is rotated, the carriage is moved along the trackway.

The motor 35 is reversible and is controlled by suitable limit switches (not shown) for interrupting the flow of current to the motor when the carriage has reached a predetermined position in its travel back and forth along the trackway. The limit switches are set so as to position the center of the stock on the supply roll in alignment with the center line 11 of the drum on the forward travel of the carriage, and to stop the carriage in the storage position as shown in FIG. 1, on the rearward travel of the carriage. The motor may be provided with a suitable built-in brake which arrests rotation of the motor armature as soon as the flow of current is interrupted by the operation of the limit switch.

The ply stock 45 is usually interwound with a liner 46 on a supply roll, such as 22, so as to prevent one layer from adhering to an adjacent layer while in storage. Accordingly, the liner is progressively removed and wound onto a rewind roll 51 as the stock is unwound and is moved onto a pan 44 from whence it can be conveniently withdrawn by an operator and applied to the tire building drum. The present invention utilizes the same type of apparatus for withdrawing the stock and liner from each of the supply rolls, hence it will be necessary to describe only one such arrangement.

Figure 6:
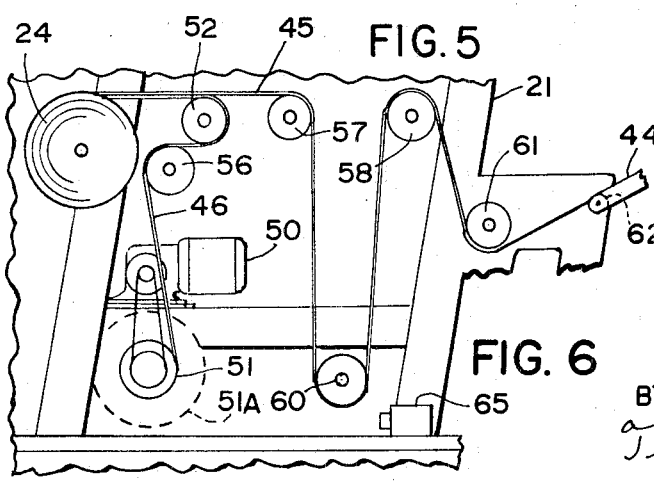
FIG. 6 is a diagrammatic side view illustrating the stock feed and liner storage arrangement.

Referring to FIG. 6, an electric motor 50 is drivingly connected to a liner rewind roll 51. The motor and rewind roll are supported by the frame and adjacent a supply roll. The stock and liner together move from the supply roll over a guide bar or roll 52 from whence the web of stock, indicated at 45, is suitably guided to a pan 44, while the liner web 46 is suitably guided to the rewind roll 51. A liner guide bar or roll 56 is positioned beneath and to the rear of the guide bar 52, from whence the liner passes to the rewind roll 51. The dotted lines 51A in FIG. 3 show the size of the rewind roll after the entire liner has been rewound thereon.

The preferred form for guiding the stock web to the pan 44 comprises guide bars or rolls 57 and 58, between which the web 46 drops in a festoon within the bight of which is disposed a weighted roller 60. From the guide bar 58 the stock web passes beneath a guide roll or bar 61 and over a guide bar or roll 62, and thence onto a pan 44. Each pan is pivotally mounted on a frame so that it may be swung upwardly to clear other pans on the frame for progressive application of the plies to the drum.

By virtue of the foregoing arrangement the stock web is withdrawn by power from the supply roll whenever the motor 50 is actuated. The motor in turn may be controlled by a limit switch (not shown) which is actuated by contact of the lower portion of the festoon so as to shut off the motor whenever the festoon reaches the bottom of its intended extent of maximum movement, and to start the motor as the stock is withdrawn by the operator and the festoon is shortened. If desired, a suitable sensing device 65 which is mounted on the frame may be used instead of the limit switch for controlling the actuation of the motor 50. In this way, a uniform tension is maintained on the web while it is being moved onto the drum.

The present invention is adapted for facilitating the application of a tread strip as well as the various stock plies as heretofore described. Thus a tread strip may be supported on a tread pan 66. Such pan may be mounted on the carriage 19 for movement with respect to the carriage from the full line position of FIG. 3 to the broken line position 66a. In the full line position, the tread strip is supported in storage position, while in the broken line position the tread strip is disposed adjacent the periphery of the drum. The tread pan may be swung with respect to the frame by means of a fluid operated power cylinder 67 which is under the control of the operator. The power unit may be suitably controlled in any well-known way.

A preferred arrangement for mounting the tread pan 66 upon the carriage includes a link 68 one end of which is pivoted at 69 to the carriage, and the other end of which is pivoted at 78 to the pan. During the swinging movement of the pan, it may be guided by a roller 79 which depends from the pan and is guided along an inclined track 89 on the carriage frame. The actuating cylinder 67 is shown as being pivotally mounted to the carriage frame at 93 and as having a piston rod which is pivotally connected to the pan at 94.

The present invention is also adapted for enabling chafer strips to be applied to a tire band. Such apparatus is indicated, in general, as comprising a frame 70 on which two stock rolls, indicated at 71 and 72, respectively, are journaled. Each such stock roll includes a liner, indicated at 73 and 74, respectively, which is adapted to be removed and wound onto a liner roll by means of an electric motor which rotates the liner roll. In each instance, the liner roll is indicated at 75 and the motor for operating the roll is indicated at 76. Additionally, the stock is allowed to fall into a festoon 77, in the manner previously described in connection with the movement of the stock strip from a supply roll on any of the carriages.

Figure 4:
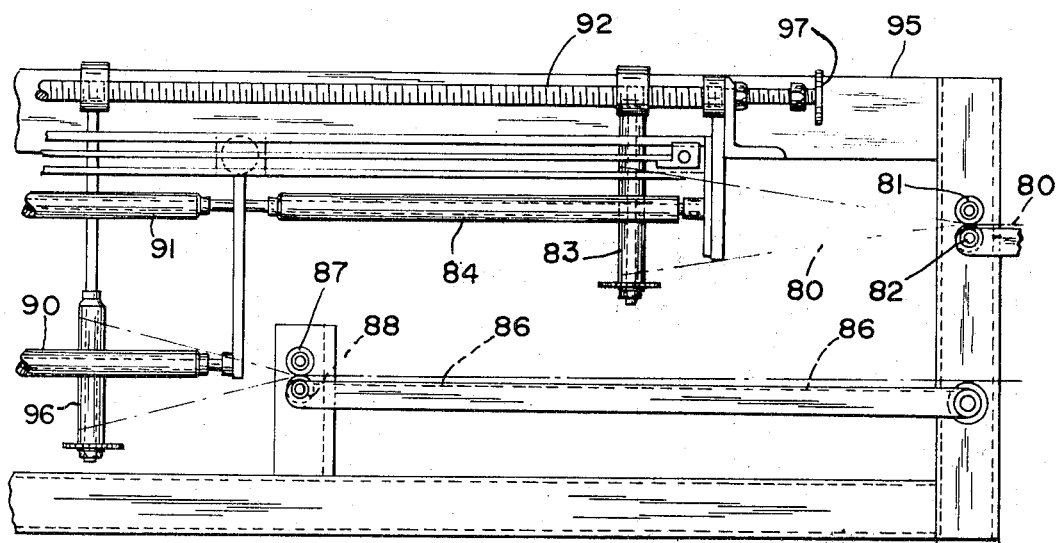
FIG. 4 is a front elevation of a portion of the chafer strip guiding apparatus on a scale larger than that used in FIG. 1.
Figure 5:
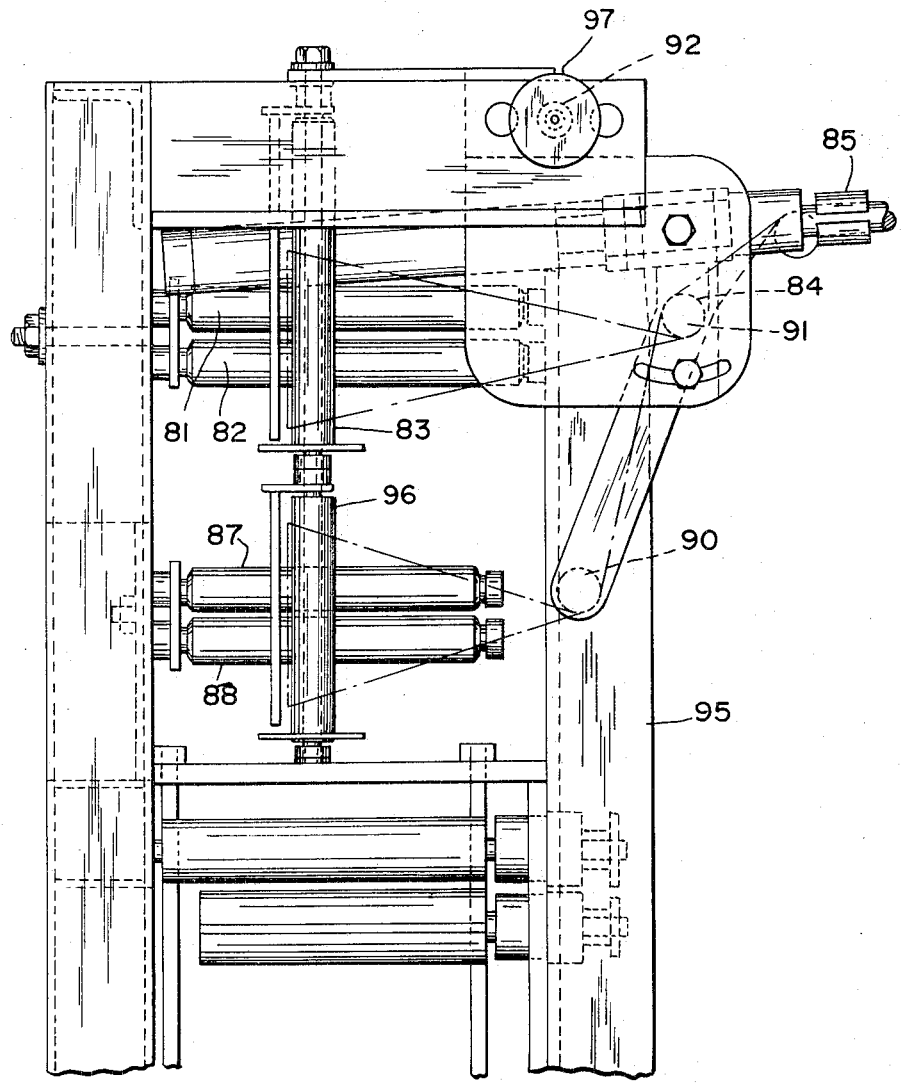
FIG. 5 is a side view of a portion of the chafer strip guiding apparatus on a scale larger than that used in FIG. 4.

A strip 80 of chafer stock from the roll 71 may be brought into the proper position for application to the tire band by passing it between guide rolls 81 and 82 (FIG. 4), thence turning it at a right angle and passing it around a vertically extending roll 83. The strip is then turned at another right angle and is passed around a horizontally extending roll 84 and thence onto a pan 85 adjacent the drum.

Similarly a strip of chafer stock 86 from roll 72 passes between guide rolls 87 and 88, thence around a vertically extending roll 96, around a horizontally extending roll 90, and then over a guide roll 91 and onto the pan 85.

The vertically extending guide rolls may be mounted for adjustment axially with respect to the drum so as to vary the position, as desired, at which the chafer strips are applied to the tire band, by means of a screw shaft 92 which is journaled on a frame 95 and which may be rotated by a hand wheel 97.

An advantage of the present invention is that the stock from any of the supply rolls travels equidistantly to the drum and in a uniform pattern to the drum. Thus all stock is delivered under similar conditions and under uniform tension. Moreover, each ply travels the shortest distance from its roll to the tire building drum.

A further advantage of the present invention is that any supply roll may be mounted on any of the carriage frames in accordance with the need for replenishing the supply of any particular ply. The ability of the operator to select plies from any roll facilitates the manufacture of tire bands and enables a roll on one carriage to be replenished while the stock from other rolls is being utilized in the building of a tire band.

To insure that no two carriages move into position behind the drum at the same time, limit switches (not shown) are utilized for providing a suitable interlock which prevents all other carriages from being operated, whenever any one of the carriages is operated.

We claim:

1. A servicing apparatus for supplying plies of tire building stock to a tire building drum comprising:
   two trackways which are disposed behind the drum, one of said trackways extending axially of the drum, and the other of said trackways extending normal to the axis of the drum,
   a carriage mounted for moveemnt on one of said trackways,
   another carriage mounted for movement on the other of said trackways,
   each carriage having one or more rolls of tire ply material mounted for rotation thereon,
   means for moving each carriage along its respective trackway between a storage position and a ply applying position in alignment with the drum,
   the trackway which extends axially of the drum has two carriages mounted thereon, each of which is mounted for movement independently of the other carriage along the trackway between a storage position at one side of the drum to a ply applying position, and wherein:
      a plane passing radially through the center of the supply roll thereon is substantially coextensive with a radial plane passing through the center of the drum.

2. Apparatus according to claim 1, wherein:
   the trackway which extends normal to the axis of the drum has its mid-portion lying substantially in a plane which passes radially through the center of the drum.

3. Apparatus according to claim 1, wherein:
   a screw and nut couple is utilized for moving each carriage and wherein:
      an electric motor is operatively connected to one of the members of the couple.

4. Apparatus according to claim 1, wherein:
   a liner rewind roll is provided for each supply roll, there being an electric motor for rotating each rewind roll and
   there being means for guiding the stock material from the supply roll into a festoon after it is separated from the liner, and
   means for controlling the operation of the motor in accordance with variations in the depth of the festoon.

5. Apparatus according to claim 1 wherein:
   one of the carriages has a tread strip pan mounted for movement thereon toward and away from the drum and positioned adjacent the upper end of the carriage, and
   there being power means for moving the pan independently of the carriage toward and away from the drum.

6. Apparatus according to claim 5, wherein:
   the means for actuating the pan comprises a fluid actuated cylinder which is pivotally connected to the carriage and a piston rod which is pivotally connected to the pan.

7. A servicing apparatus for supplying plies of tire building stock to a tire building drum comprising:
   two trackways which are disposed behind the drum, one of said trackways extending axially of the drum, and the other of said trackways extending normal to the axis of the drum,
   a carriage mounted for movement on one of the trackways,
   another carriage mounted for movement on the other of said trackways,
   each carriage having one or more rolls of tire ply material mounted for rotation thereon,
   means for moving each carriage along its respective trackway between a storage position and a ply applying position in alignment with the drum,
   chafer strip supply rolls are supported on a frame between the axially extending trackway and the drum and wherein:
      guiding means are provided for the respective chafer strips so as to position them upon the drum on opposite sides of the radial central position of the drum.

8. Apparatus according to claim 7, wherein:
   means are provided for adjusting the guiding means axially of the drum.

9. Apparatus according to claim 7, wherein:
   the guiding means for each chafer strip comprises a pair of horizontally disposed rolls, a vertically positioned roll and a horizontally disposed roll between and around which the chafer strip progressively passes as it is moved onto the drum.

10. A servicing apparatus for supplying plies of tire building stock to a tire building drum comprising:
    two trackways which are disposed behind said drum, one of said trackways extending axially of said drum, and the other of said trackways extending normal to the axis of said drum,
    a carriage mounted for movement on one of said trackways,
    another carriage mounted for movement on the other of said trackways,
    each carriage having one or more rolls of tire ply material mounted for rotation thereon,
    means for moving each carriage along its respective trackway between a storage position and a ply applying position, and
    said trackways include a cross over means to enable said carriages to move the full length of said trackways and position the respective supply rolls disposed thereon approximately the same distance away from said drum in the ply applying position.

11. An apparatus in accordance with claim 10, wherein:
    the trackway which extends normal to the axis of said drum has its mid-portion aligned substantially in a plane which passes radially through the center of the drum.

12. An apparatus in accordance with claim 10, wherein:
    a plane passing radially through the center of the respective supply rolls is substantially coextensive with a radial plane passing through the center of said drum in the ply applying position.

13. An apparatus in accordance with claim 10, wherein:
    said trackway which extends axially of said drum has two carriages mounted thereon each of which is mounted for movement independently of and toward one another along the trackway to move from the storage position at one side of the drum to the ply applying position located generally centrally with respect to the drum.

14. An apparatus in accordance with claim 10, wherein:
    a liner rewind roll is provided for each supply roll, there being power means for rotating each rewind roll and there being means for guiding the stock material from the supply roll into a festoon after it is separated from the liner, and
    means for controlling the power means in accordance with the variations in the depth of the festoon.

15. An apparatus in accordance with claim 10, wherein: one of the carriages has a tread strip pan mounted for movement thereon toward and away from said drum and positioned adjacent the upper end of said carriage, there being power means for moving said pin independently of said carriage toward and away from said drum.

16. An apparatus in accordance with claim 15, wherein: said means for actuating said pan comprises a fluid actuated cylinder which is pivotally connected to said carriage and a piston rod which is pivotally connected to said pan.

References Cited

UNITED STATES PATENTS

| | | | |
|---|---|---|---|
| 1,469,272 | 10/1923 | Hermann | 156—406 |
| 3,162,562 | 12/1964 | Wenger et al. | 156—406 |
| 3,196,066 | 7/1965 | Hollis | 156—405X |

BENJAMIN A. BORCHELT, Primary Examiner

S. C. BENTLEY, Assistant Examiner

U.S. Cl. X.R.

242—58.6